(12) United States Patent
Zhou et al.

(10) Patent No.: US 11,791,611 B2
(45) Date of Patent: Oct. 17, 2023

(54) ARC MITIGATION DEVICES

(71) Applicant: Eaton Intelligent Power Limited, Dublin (IE)

(72) Inventors: Xin Zhou, Wexford, PA (US); Joe W. Kirstein, Lexington, SC (US); William Michael Crooks, Sumter, SC (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/507,017

(22) Filed: Oct. 21, 2021

(65) Prior Publication Data

US 2022/0045484 A1 Feb. 10, 2022

Related U.S. Application Data

(62) Division of application No. 16/419,627, filed on May 22, 2019, now Pat. No. 11,183,817.

(51) Int. Cl.
| | |
|---|---|
| *H01T 2/02* | (2006.01) |
| *H02H 9/06* | (2006.01) |
| *H01T 4/02* | (2006.01) |
| *H01T 4/04* | (2006.01) |

(52) U.S. Cl.
CPC ............. *H01T 2/02* (2013.01); *H01T 4/02* (2013.01); *H01T 4/04* (2013.01); *H02H 9/06* (2013.01)

(58) Field of Classification Search
CPC .... H01T 2/02; H01T 4/02; H01T 4/04; H02H 9/06
See application file for complete search history.

(56) References Cited

U.S. PATENT DOCUMENTS

| | | | |
|---|---|---|---|
| 6,724,604 B2 | 4/2004 | Shea | |
| 9,025,299 B2 | 5/2015 | Shea et al. | |
| 10,819,106 B2 * | 10/2020 | Burns | ........................ H01T 2/02 |
| 2005/0128033 A1 | 6/2005 | Mueller | |
| 2011/0149482 A1 * | 6/2011 | Shea | ..................... H02B 13/025 |
| | | | 361/624 |
| 2013/0120879 A1 | 5/2013 | Shea et al. | |
| 2015/0236495 A1 * | 8/2015 | Shea | .......................... H01T 2/02 |
| | | | 361/54 |
| 2015/0236496 A1 * | 8/2015 | Shea | .......................... H01T 2/02 |
| | | | 361/42 |
| 2016/0285259 A1 * | 9/2016 | Shea | .......................... H01T 2/02 |

* cited by examiner

*Primary Examiner* — Kyle J Moody
*Assistant Examiner* — Jye-June Lee
(74) *Attorney, Agent, or Firm* — Stanek Lemon Crouse & Meeks, PA

(57) ABSTRACT

An apparatus includes a housing (e.g., a housing having a form factor of a molded case circuit breaker) and at least two phase terminals supported by the housing and configured to be connected to respective ones of at least two phase buses in an electrical panelboard. The apparatus further includes at least one fault generation device supported by the housing and including an arc containment chamber and first and second spaced-apart electrodes in the arc containment chamber and electrically coupled to respective ones of the at least two phase terminals.

7 Claims, 10 Drawing Sheets

ARC MITIGATION DEVICES

CROSS-REFERENCE TO RELATED APPLICATION

This application is a divisional of U.S. patent application Ser. No. 16/419,627; filed May 22, 2019, the contents of which are incorporated by reference in its entirety.

BACKGROUND

The inventive subject matter relates to electrical power apparatus and methods and, more particularly, to protection apparatus for electrical power equipment.

Arc faults may be caused by a variety of different events, including inadvertent dropping of metal tools on energized components, misalignment of switch contacts, failure of connections, and failed cable or bus insulation. Arc faults can produce arc flashes with sufficient energy to kill or injure personnel and significantly damage equipment.

Several techniques have been developed to mitigate the effects of arc faults. For example, equipment enclosures may be designed to contain and/or channel arc flash heat and gases to reduce or minimize exposure to personnel. Switchgear and similar equipment may also be equipped with active devices that may reduce arc flash energy. For example, U.S. Pat. No. 6,724,604 to Shea et al. and U.S. Pat. No. 9,025,299 to Shea et al. describe arc fault mitigation devices that can potentially reduce the likelihood and severity of personnel injury and equipment damage arising from arc faults.

SUMMARY

Some embodiments of the inventive subject matter provide an apparatus including a housing and at least two phase terminals supported by the housing and configured to be connected to respective ones of at least two phase buses in an electrical panelboard. The apparatus further includes at least one fault generation device supported by the housing. The at least one arc fault generation device includes an arc containment chamber, with first and second spaced-apart electrodes being disposed in the arc containment chamber and electrically coupled to respective ones of the at least two phase terminals.

In some embodiments, the apparatus may include first, second and third phase buses supported by the housing. The at least two phase terminals may include first, second and third phase terminals of respective ones of the first, second and third phase buses configured to be connected to respective first, second and third phase conductors of the panelboard. The at least one fault generation device may include a first fault generation device having its first and second electrodes coupled to the first and second phase buses, respectively, and a second fault generation device having its first and second electrodes coupled to the second and third buses, respectively.

Each of the first and second fault generation devices may include an elongate housing and first and second terminals disposed at respective first and second ends of the elongate housing along a longitudinal axis thereof. The first, second and third buses may include first, second and third bus bars extending in parallel along a direction transverse to the longitudinal axes of the first and second fault generation devices. The first terminal of the first fault generation device may be connected to the first bus bar, the second terminal of the first fault generation device may be connected to the second bus bar, the first terminal of the second fault generation device may be connected to the third bus bar, and the second terminal of the second fault generation device may be connected to the second bus bar. In some embodiments, the first, second and third bus bars may be aligned in a first plane and the first and second terminals of the first and second fault generation devices may be aligned in a second plane parallel to the first plane. The first terminal of the first fault generation device may be connected to the first bus bar by a first conductive member, the first terminal of the second fault generation device may be connected to the third bus bar by a second conductive member, the second terminals of the first and second fault generation devices may be interconnected by a third conductive member aligned with the second plane, and the third conductive member may be connected to the second bus bar by a fourth conductive member.

In some embodiments, each fault generation device may include a cylindrical body and first and second end caps covering first and second ends of the body to define the arc containment chamber. The first and second electrodes may include respective first and second cylindrical electrodes extending through respective ones of the first and second end caps into the arc containment chamber, the first and second electrodes having longitudinal axes aligned with a longitudinal axis of the body and having a gap therebetween in the arc containment chamber. The fault generation device may further include a trigger conductor extending across an end of the first electrode in the gap and facing an end of the second electrode.

In further embodiments, an apparatus includes a cylindrical body, first and second end caps covering first and second ends of the cylindrical body to define an arc containment chamber, first and second cylindrical electrodes extending through respective ones of the first and second end caps into the arc containment chamber, the first and second electrodes having longitudinal axes aligned with a longitudinal axis of the body and having a gap therebetween in the arc containment chamber, and a trigger conductor extending across an end of the first electrode in the gap and facing an end the second electrode. The trigger conductor may include a folded portion including first and second overlapping sections overlying the end of the first electrode and separated from the end of the first electrode by an insulator. An insulating sleeve may surround the second section of the trigger conductor and the sleeved second section of the trigger conductor may separate the first section of the trigger conductor from the end of the first electrode. The first section of the trigger conductor may have a fusing cut formed therein. The apparatus may further include a control lead coupled to the trigger conductor and accessible from outside of the arc containment chamber.

Still further embodiments provide an apparatus including a housing having a molded circuit breaker housing form factor. First, second and third bus bars are disposed in the housing and have respective terminals for connection to first, second and third phase conductors. A first fault generation device is disposed in the housing and connected between the first and second bus bars. A second fault generation device is disposed in the housing and connected between the second and third bus bars. The first, second and third bus bars may extend in parallel. The first and second fault generation device may each include a cylindrical body and may be arranged side-by-side with longitudinal axes of the cylindrical bodies arranged transverse to the first, second and third bus bars. Each of the first and second fault generation devices may include first and second end caps covering first and second ends of the cylindrical body to define an arc containment chamber. First and second cylindrical electrodes may extend through respective ones of the first and second end caps into the arc containment chamber, the first and second electrodes having longitudinal axes aligned with a longitudinal axis of the body and having a gap therebetween in the arc containment chamber. A trigger conductor extends across an end of the first electrode in the gap and facing an end the second electrode.

DETAILED DESCRIPTION

Figure 1:
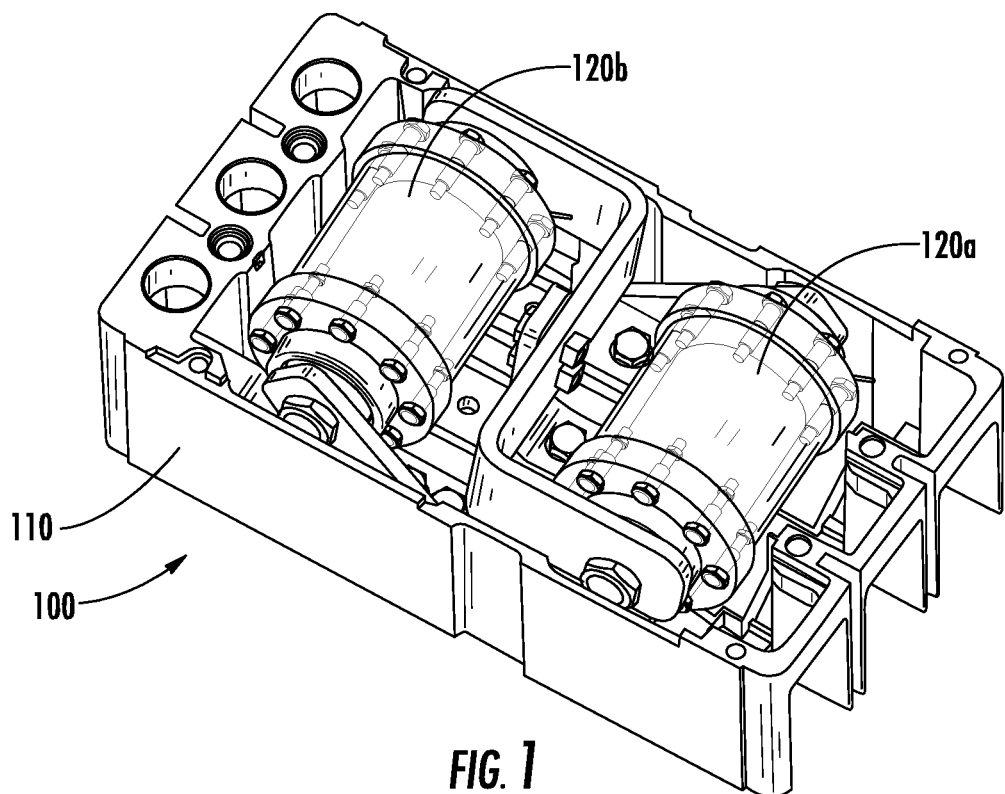
FIG. 1 is a perspective view of an arc mitigation device according to some embodiments of the inventive subject matter.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Figure 2:
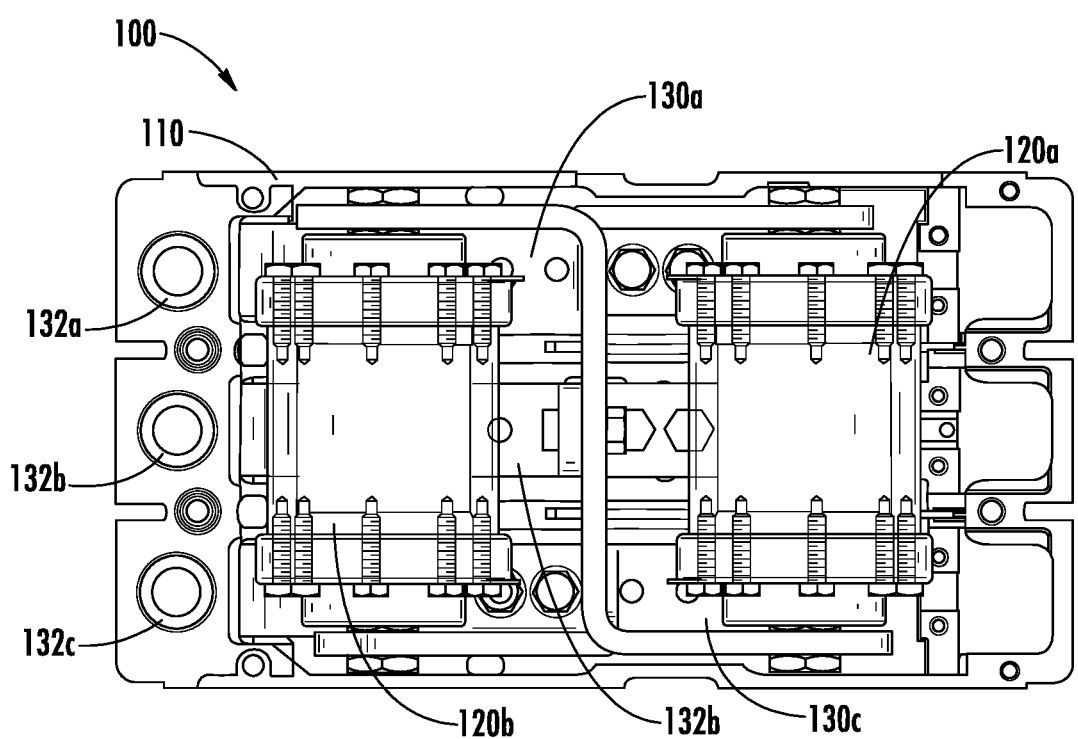
FIG. 2 is a top view of the arc mitigation device of FIG. 1.

FIGS. 1 and 2 illustrate an arc mitigation device 100 according to some embodiments. The arc mitigation device 100 includes a housing, here a housing 110 having a form factor substantially similar to that of a circuit breaker, such as an Eaton Series C® molded case circuit breaker. Packaging the arc mitigation device 100 in such a housing may find particularly advantageous application in providing arc fault mitigation in an electrical panelboard or other equipment at a location suited for installation of a standard form factor breaker. It will be appreciated however, that embodiments of the inventive subject matter are not limited to such a form factor.

The housing supports first and second fault generation devices 120a, 120b, which are connected to bus bars 130a, 130b, 130c. The bus bars 130a, 130b, 130c have respective terminals 132a, 132b, 132c for connecting the bus bars 130a, 130b, 130c to, for example, respective bus conductors of an electrical panelboard in which the arc mitigation device 100 is installed. The arc-mitigation device 100 can be used, for example, to mitigate the effects of an arc fault of one or more of the panelboard buses. For example, responsive to detection of such a fault, contained faults between the buses 130a, 130b, 130c may be created within the fault generation devices 120a, 120b, which can potentially reduce the amount of damaging heat, pressure waves, shrapnel, sound waves, intense light, and toxic gases produced by the arc associated with the detected fault. As explained below, the fault generation devices 120a, 120b may be triggered responsive to light and increased current associated with the original fault.

Figure 3:
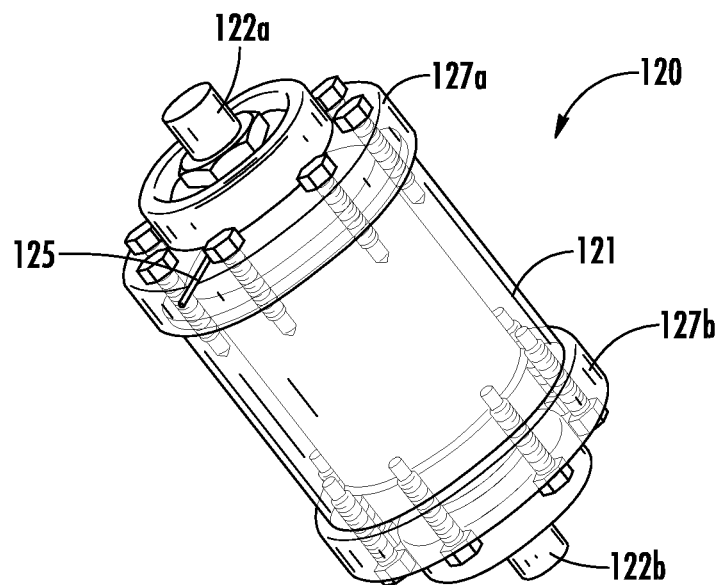
FIG. 3 is a perspective view of a fault generation device of the arc mitigation device of FIGS. 1 and 2.
Figure 4:
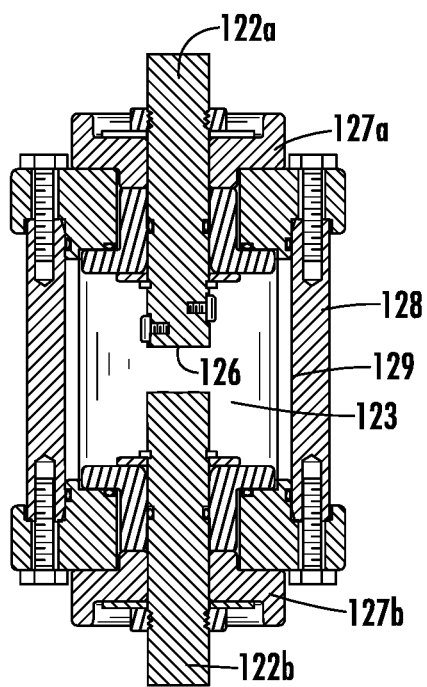
FIG. 4 is a cross sectional view of the fault generation device of FIG. 3.
Figures 5, 6, 7:
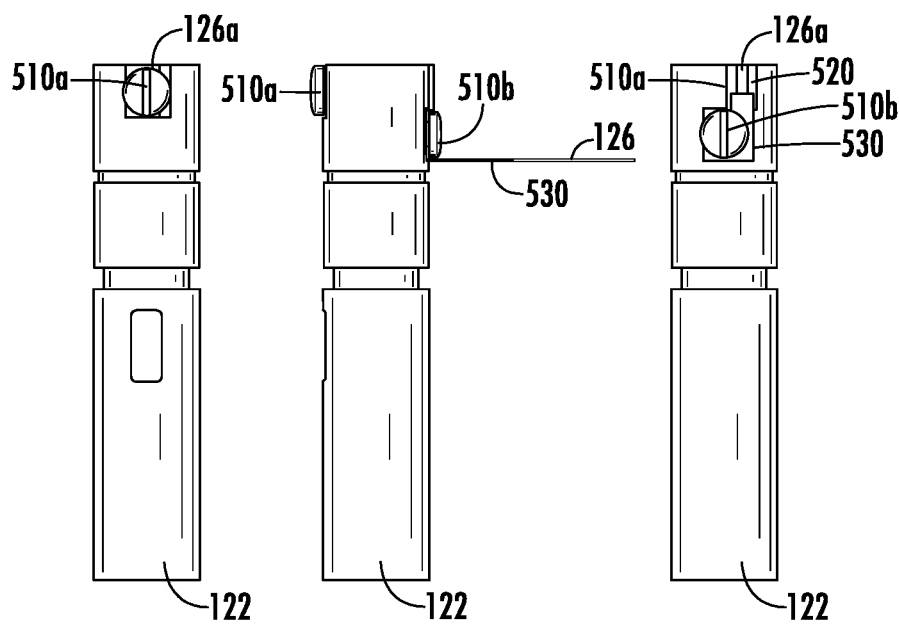
FIGS. 5-7 are side views of an electrode and trigger conductor structure of a fault generation device according to some embodiments.
Figures 8, 9:
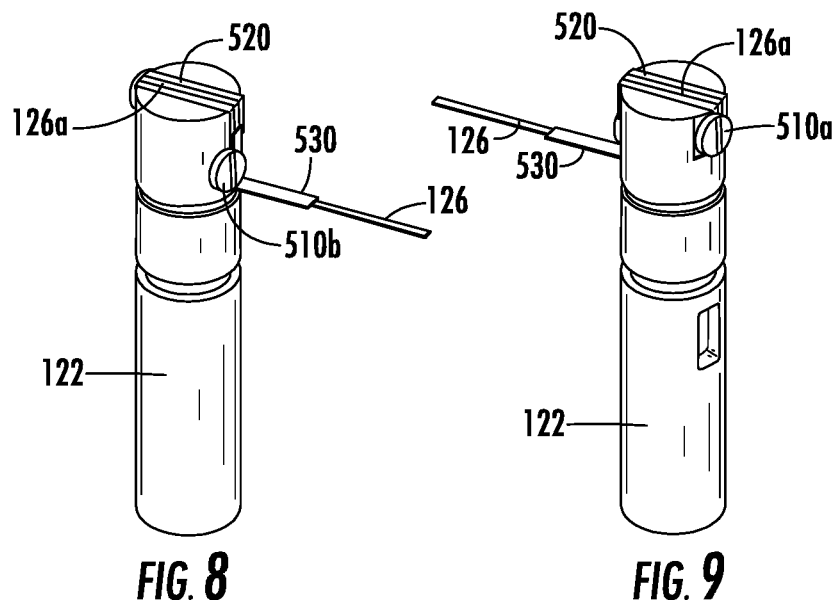
FIGS. 8 and 9 are perspective views of the electrode and trigger conductor of FIGS. 5-7.
Figure 10:
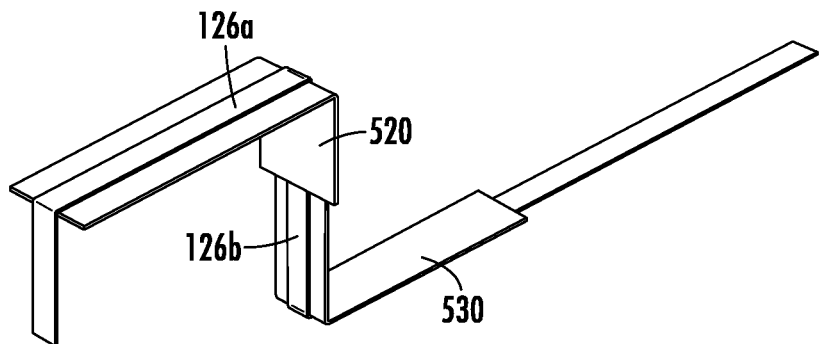
FIGS. 10 and 11 are isolated perspective views of the trigger conductor of FIGS. 5-9.
Figure 11:
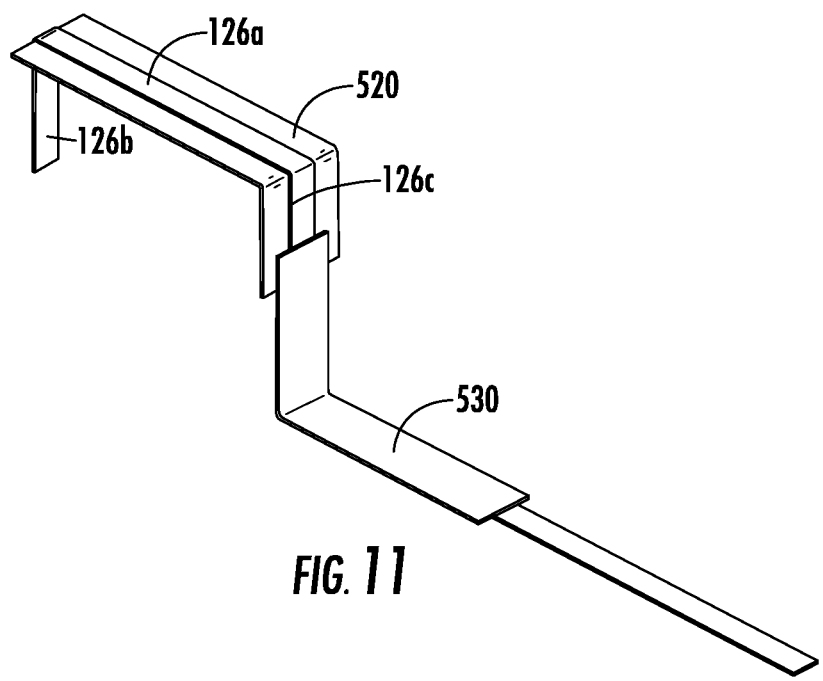
Figure 12:
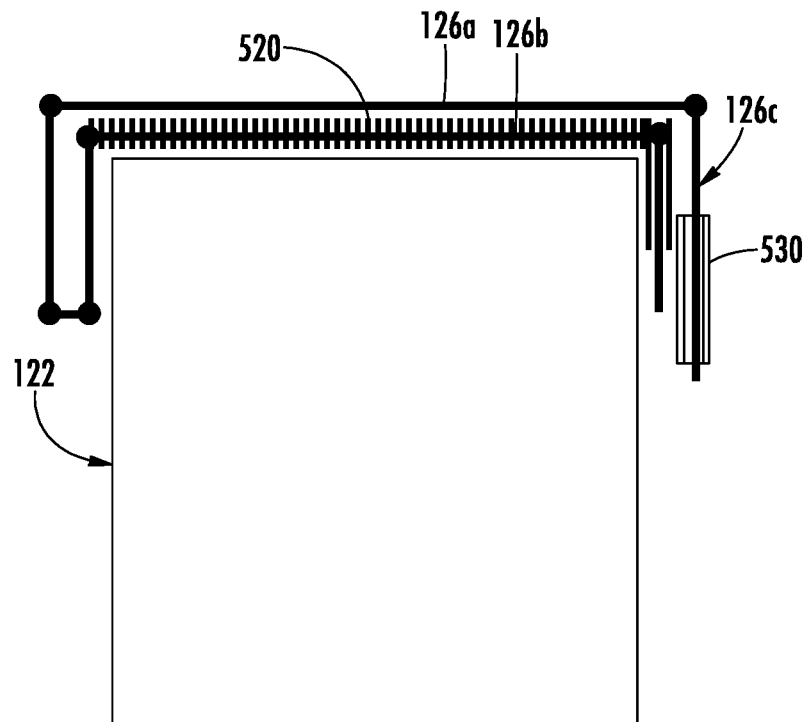
FIG. 12 is a side view of a trigger conductor arrangement for the trigger conductor of FIGS. 5-9.

FIGS. 3 and 4 illustrate a fault generation device 120 according to some embodiments. The fault generation device 120 includes a housing 121 having a cylindrical body 128 and end cap structures 127a, 127b that together enclose an arc-containment chamber 123. The cylindrical body 128 and end cap structures may be fabricated from a variety of different materials, such as stainless steel. In some embodiments, the housing 121 may further include an inner liner 129, which may be, for example, a cylindrical member formed a copper-tungsten alloy (e.g., Elkonite®) or other material that provides enhanced strength and resistance to fault-generated heat and pressure.

First and second electrodes 122a, 122b are aligned with a longitudinal axis of the housing 121 pass through the end cap structures 127a, 127b into the arc containment chamber 123. Ends of the electrodes 122a, 122b outside of the chamber 123 may serve as terminals for connecting the fault generation device 120 to bus bars or other external conductors. For example, external ends of the electrodes 122a, 122b may be externally threaded or have threaded holes therein configured to accept nut or bolts for fastening bus bars or other conductors to the ends of the electrodes 122a, 122b. However, it will be appreciated that other terminal arrangements, such as clamping connectors, may be used.

Within the fault-containment chamber 123, a gap is provided between ends of the first and second electrodes 122a, 122b. A trigger conductor 126 is affixed to one of the electrodes 122a in this gap and may be used to generate a fault between the first and second electrodes 122a, 122b. In particular, using an external lead 125, a current may be passed through the trigger conductor 126, causing the trigger conductor 126 to bridge across the gap, fuse and create an arc fault between the electrodes 122a, 122b.

FIGS. 5-12 illustrate the electrode and trigger conductor structure in greater detail. Referring to FIGS. 5-12, an electrode 122 is a generally cylindrical structure formed of a conductive material, particularly one suited for use in applications involving elevated temperatures. For example, the electrode 122 may be formed of an Elkonite® material, which are compositions of copper and refractory metals (e.g., tungsten, molybdenum and tungsten carbide).

A trigger conductor 126 is folded over to form a top section 126a and a bottom section 126b and is mechanically attached and electrically connected to the electrode 122 on a first side thereof using, for example, a first screw 510a. The bottom section 126b is covered by a first insulating sleeve 520, which isolates the bottom section 126b from the electrode 122. The top section 126a of the folded trigger conductor 126 passing over the end of the electrode 122 is electrically isolated from both the bottom portion 126b and the end of the electrode 122 by the first insulating sleeve 520, which covers the bottom section 126b of the trigger conductor 126.

On a second side of the electrode 122, the top section 126a of the trigger conductor 126 has a cut 126c that serves as fusing point (i.e., a point at which the trigger conductor 126 separates under high current conditions). Below the fusing point cut 126c, the top section 126a of the trigger conductor 126 is covered by a second insulating sleeve 530. A second screw 510b affixes the portion of the trigger conductor 126 covered by the second sleeve 530 to the electrode 122 such that the top section 126a of the trigger conductor 126 is held against the electrode 122 but electrically isolated from the electrode 122 by the sleeve 520. The bottom portion 126b of the trigger conductor 126 is also held against the electrode 122 by the second screw 510b but is not electrically insulated from the electrode 122. The illustrated structure supports concentration of current through the relatively thin top section 126a of the trigger conductor 126 overlying the end of the electrode 122, thus facilitating the fusing of the trigger conductor 126.

It will be appreciated that the trigger conductor 126 is generally a sacrificial element that is destroyed by operation of the device. After operation of the device, the trigger conductor 126 can be replaced to enable reuse of the device 120. In particular, the end cap structure 127a can be removed to access the containment chamber 123 to remove debris. Remnants of the used trigger conductor 126 on the electrode 122a can be removed by loosening the screws 510a, 510b. A new trigger conductor 126 and associated insulation components 520 and 530 can then be installed using the screws 510a, 510b. Damaged ones of the electrodes 122a, 122b may also be replaced. In particular, the end cap structures 127a, 127b may be disassembled to allow removal and replacement of damaged electrodes 122a, 122b.

Figure 13:
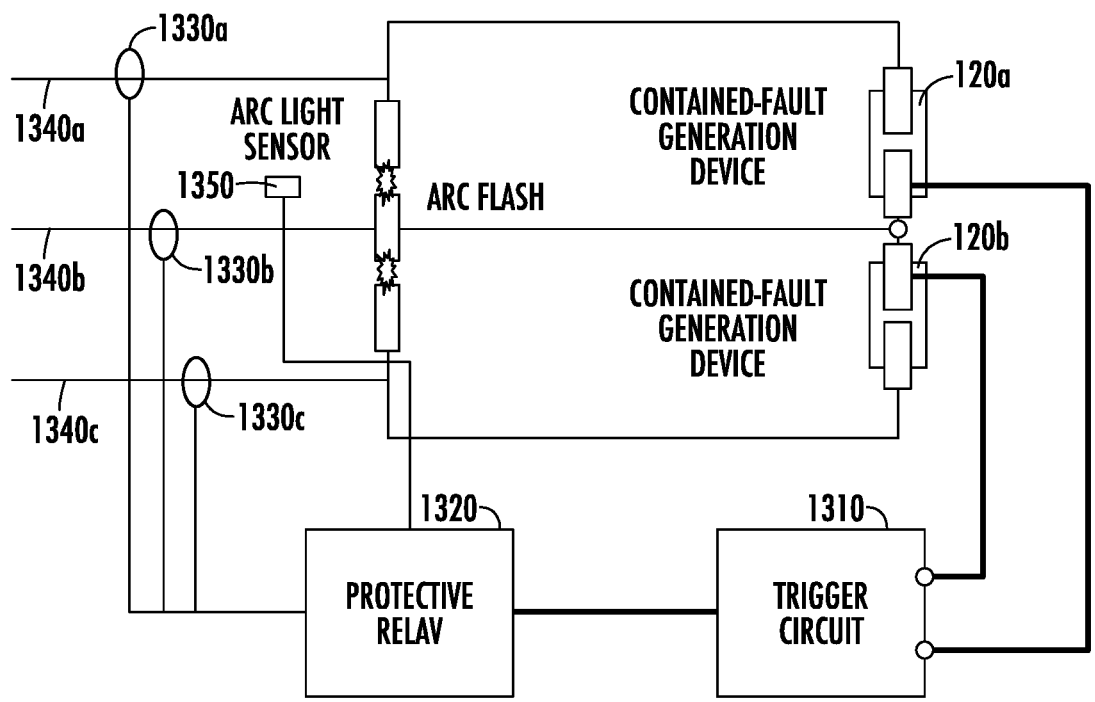
FIG. 13 is a schematic block diagram of an arc mitigation system according to some embodiments.
Figure 14:
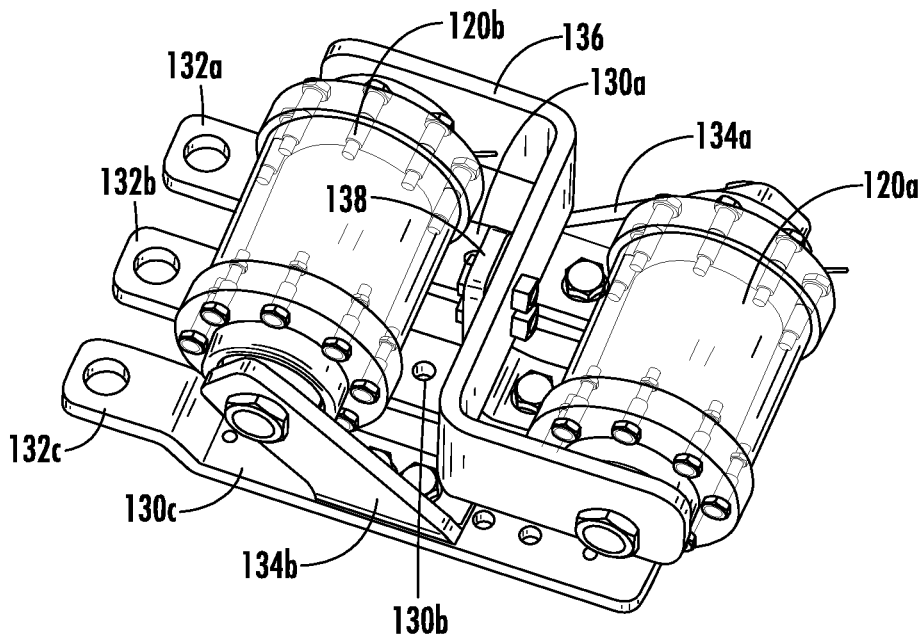
FIG. 14 is a perspective view of fault generation devices and bus bars of the arc mitigation device of FIG. 1.
Figure 15:
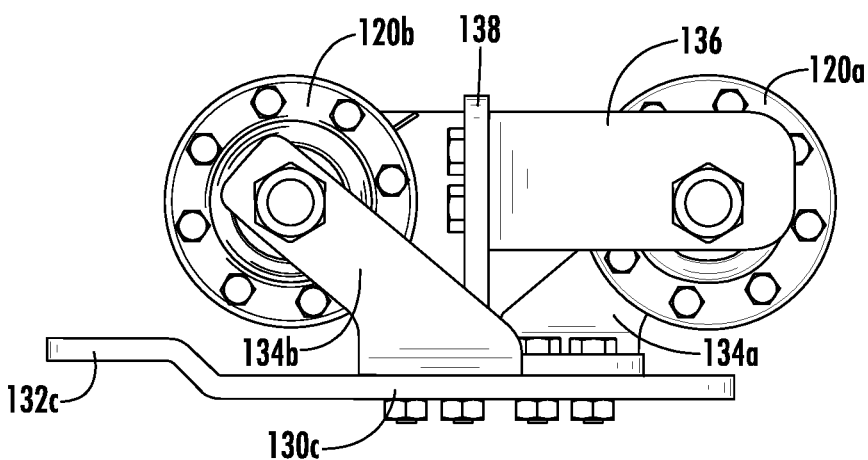
FIG. 15 is a side view of the fault generation devices and bus bars of FIG. 3.
Figure 16:
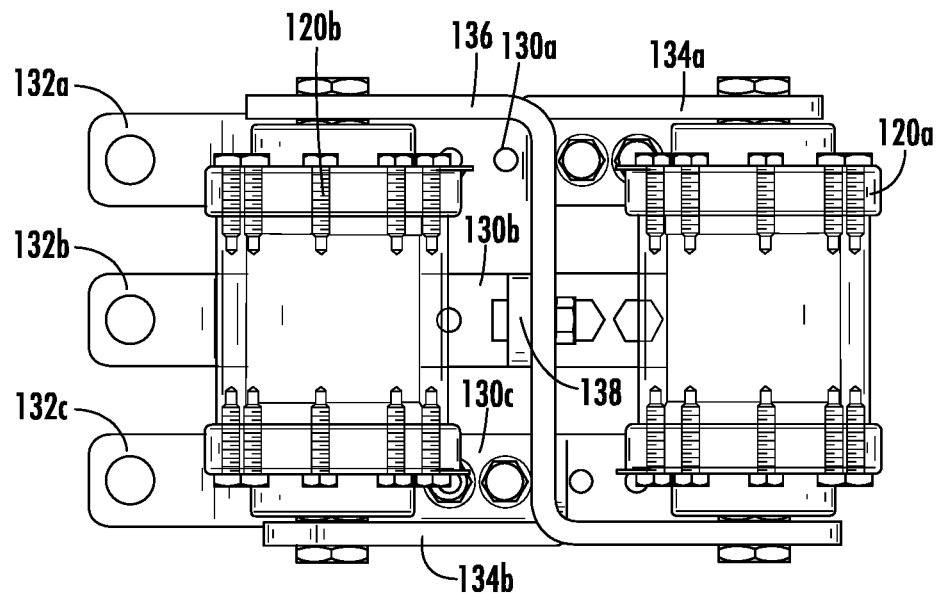
FIG. 16 is a top view of the fault generation devices and bus bars of FIG. 3.
Figure 17:
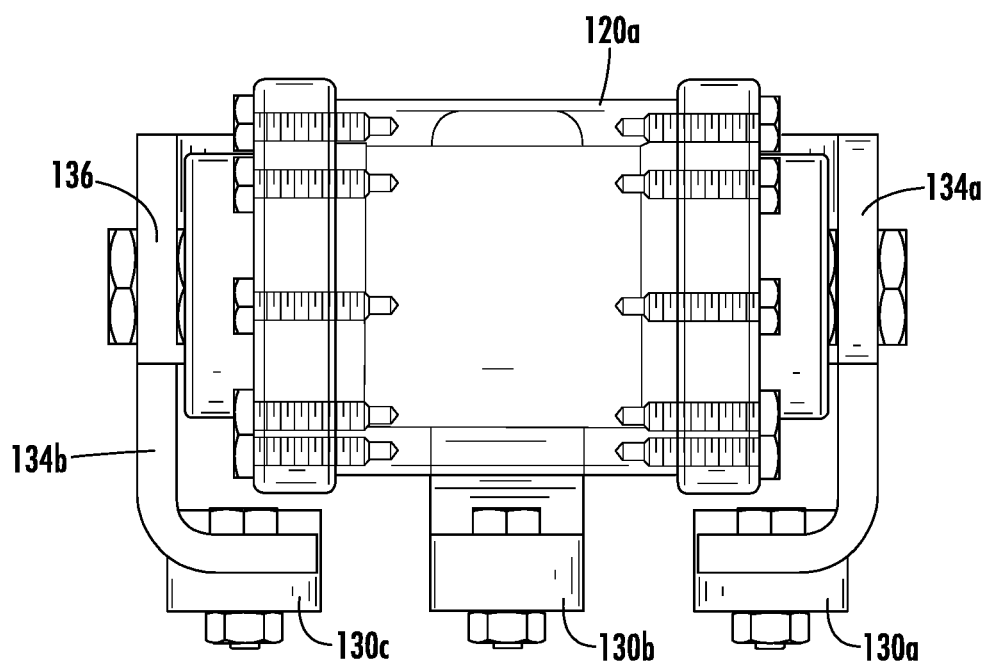
FIG. 17 is an end view of the fault generation devices and bus bars of FIG. 3.

FIG. 13 illustrates an arc-mitigation system according to further embodiments. The system includes first and second fault generation devices 120a, 120b coupled to first second, and third phase conductors 1340a, 1340b, 1340c. In particular, the first fault generation device 120a is connected between the first and second phase conductors 1340a, 1340b and the second fault generation device 120b is connected between the second and third phase conductors 1340b, 1340c. The fault generation devices 120a, 120b are coupled to a control circuit 1310, which controls currents passing through the trigger conductors of the fault generation devices 120a, 120b. The control circuit 1310 operates responsive to a protective relay device 1320, which is coupled to current sensors 1330a, 1330b, 1330c that sense current in respective ones of the first, second and third phase conductors 1340a, 1340b, 1340c, and to an arc light sensor 1350, which is configured to detect the light produced by an arc flash. Responsive to detection of current levels and arc flash light associated with an arc fault, the protective relay 1320 causes the control circuit to generate a current in the trigger conductors of the fault generation devices 120a, 120b. This, in turn, causes generation of faults within the fault generation devices 120a, 120b.

FIGS. 14-17 illustrate components of the arc mitigation device 100 of FIGS. 1 and 2 with the housing 110 absent. The bus bars 130a, 130b, 130c are generally elongate bars formed from a conductive material, such as copper or an aluminum alloy. The bus bars 130a, 130b, 130c extend in parallel and generally lie in the same plane underneath the first and second fault generation devices 120a, 120b. The longitudinal axes of the first and second fault generation devices 120a, 120b generally lie in a second plane parallel to the plane of the bus bars 130a, 130b, 130c and are oriented transverse to the bus bars 130a, 130b, 130c. A first terminal of the first fault generation device 120a is connected to the first bus bar 130a by a first member 134a. A first terminal of the second fault generation device 120b is connected to the third bus bar 130c by a second conductive member 134b. Second terminals of the first fault generation device 120a and the second fault generation device 120b are interconnected by a serpentine third conductive member 136, which is connected to the second bus bar 130b by a fourth conductive member 138.

Figure 18:
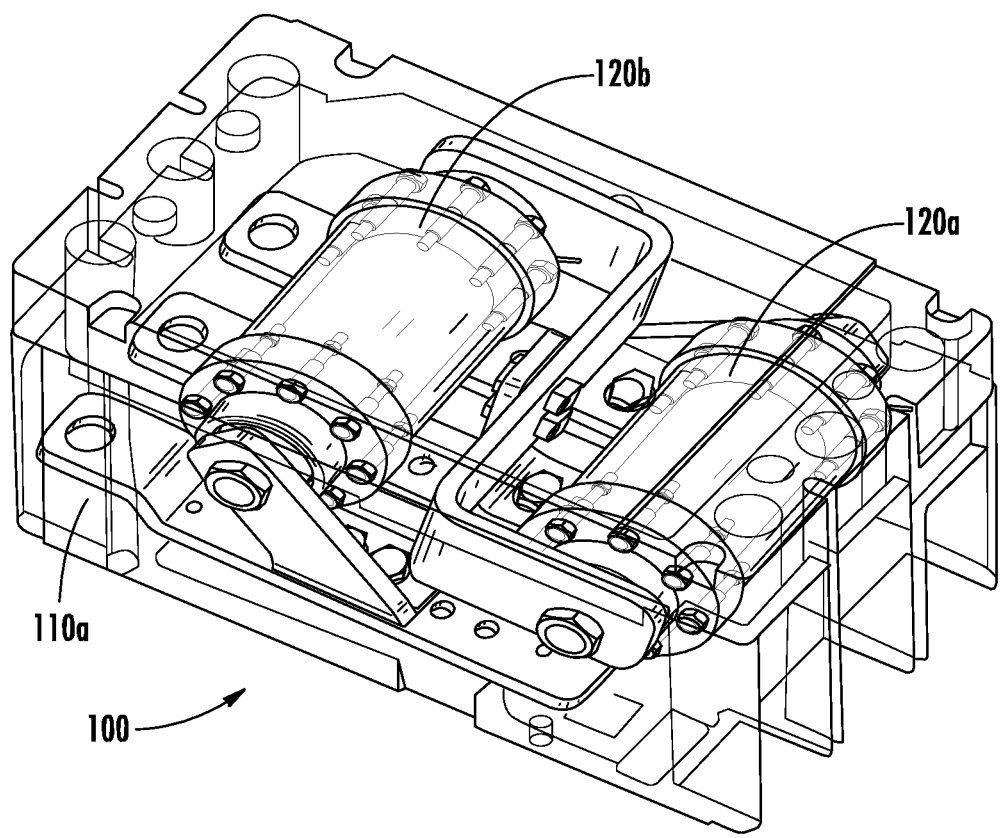
FIG. 18 illustrates the are mitigation device of FIGS. 1 and 2 with a cover installed.

FIG. 18 illustrates the arc mitigation device 100 of FIGS. 1 and 2 according to further embodiments. The device housing 110 includes a base portion 110a, which includes a compartment in which the fault generation devices 120a, 120b and associated bus bar structures are positioned. The housing 110 further includes a cover 110b that covers the fault generation devices 120a, 120b and bus structures, thus providing a unit that has the form factor of a molded case circuit breaker. As shown in FIG. 18, the arc mitigation device 100 can be mounted in a panelboard, for example, in a location configured for installation of a molded case circuit breaker. The arc mitigation device 100 can be designed as a single-use (sacrificial) device that can be replaced after one operation.

Figure 19:
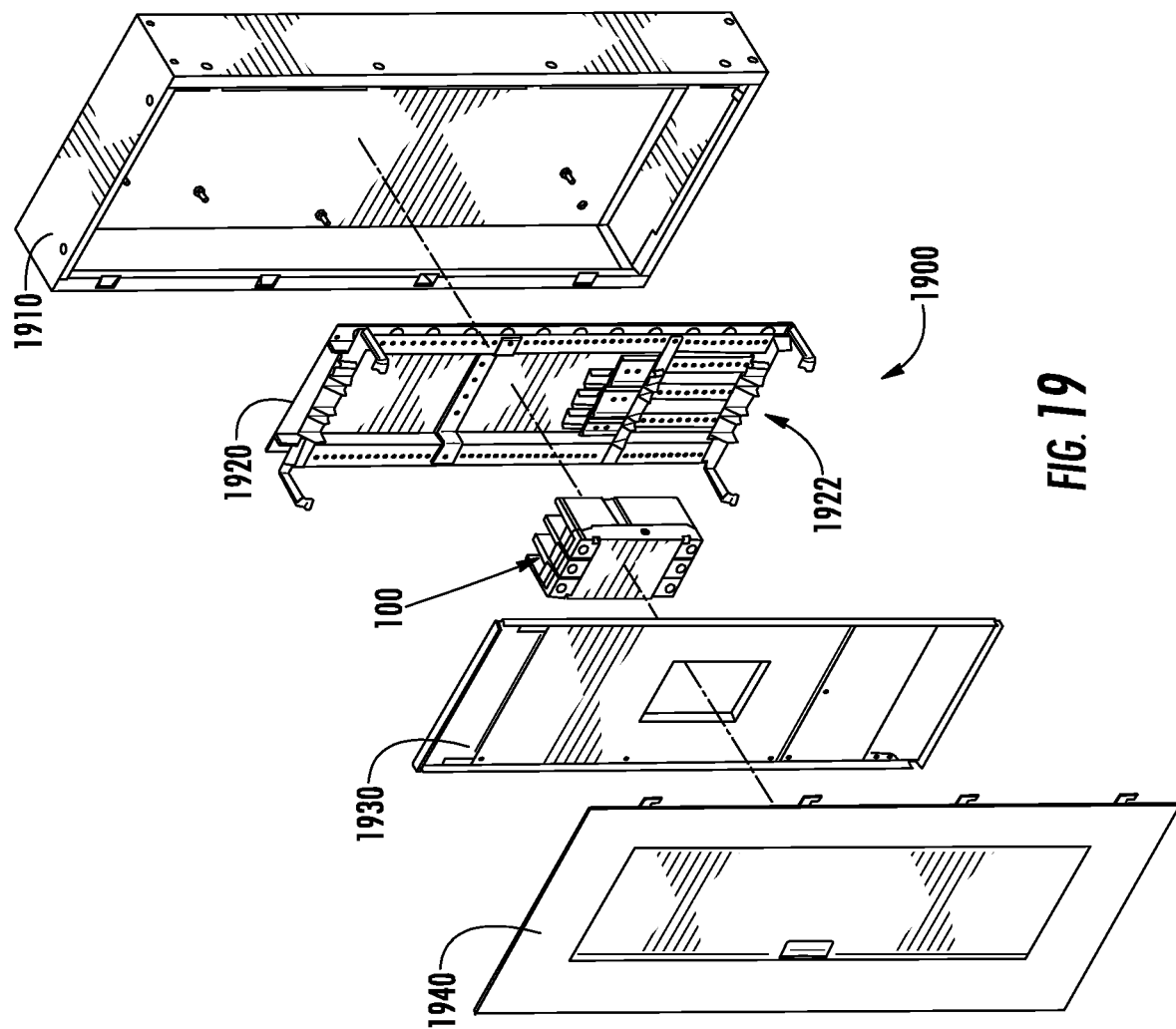
FIGS. 19 and 20 illustrate the arc mitigation device of FIG. 18 installed in an electrical panelboard.
Figure 20:
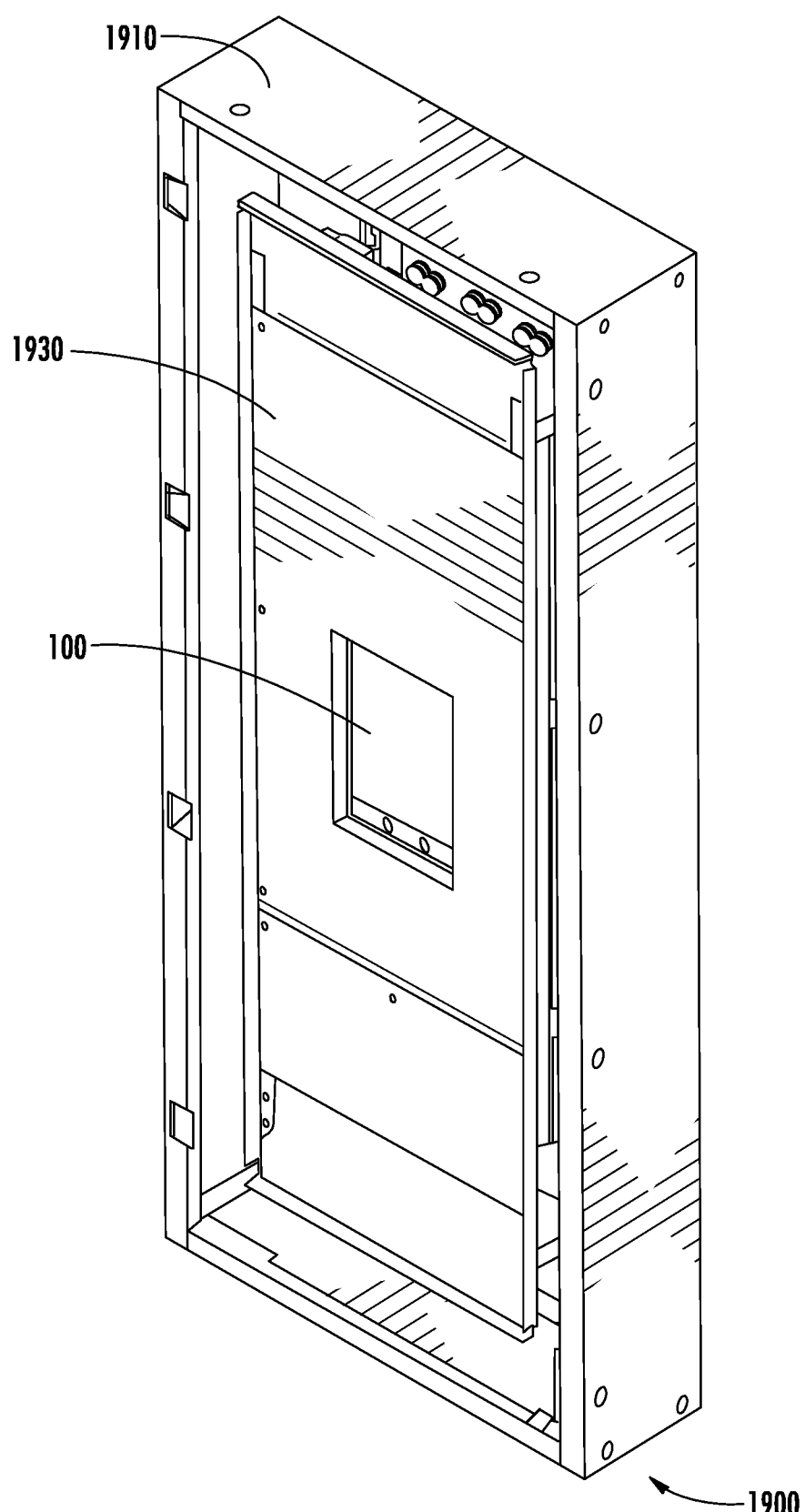

FIGS. 19 and 20 illustrate an example application of an arc mitigation device according to some embodiments. A panelboard 1900 may be configured to receive a standard form circuit breaker. The panelboard 1900 includes a housing 1910 and a bus backplane assembly 1920 configured to be mounted within the housing 1910. The bus backplane assembly 1920 may be configured to receive a circuit breaker, which may be electrically connected to buses 1922 of the bus backplane assembly 1920. An inner cover 1930 may cover the bus backplane assembly 1920 and include a cutout sized to expose a front face of a circuit breaker installed in the bus backplane assembly. An outer cover 1940 is configured to cover the inner cover and the exposed face of the installed circuit breaker. As illustrated, according to some embodiments, an arc mitigation device 100 having a form factor substantially the same as a circuit breaker may be installed in the panelboard 1900, instead of a circuit breaker.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. An apparatus comprising:
   a cylindrical body;
   first and second end caps covering first and second ends of the cylindrical body to define an arc containment chamber;
   first and second cylindrical electrodes extending through respective ones of the first and second end caps into the arc containment chamber, the first and second electrodes having longitudinal axes aligned with a longitudinal axis of the cylindrical body and having a gap therebetween in the arc containment chamber; and
   a trigger conductor conforming to and affixed to a sidewall of the first electrode, extending from the sidewall on to an end of the first electrode facing an end of the second electrode.

2. The apparatus of claim 1, wherein the trigger conductor comprises a folded portion comprising first and second overlapping sections overlying the end of the first electrode and separated from the end of the first electrode by an insulator.

3. The apparatus of claim 2, further comprising an insulating sleeve surrounding the second section of the trigger conductor and wherein the sleeved second section of the trigger conductor separates the first section of the trigger conductor from the end of the first electrode.

4. The apparatus of claim 3, wherein the insulating sleeve comprises a first insulating sleeve and further comprising a second insulating sleeve surrounding a portion of the first section conforming to the sidewall of the first electrode and electrically isolating the sleeved portion of the first section from the first electrode.

5. The apparatus of claim 2, wherein the first section of the trigger conductor has a fusing cut formed therein.

6. The apparatus of claim 2, wherein first and second ends of the first and second overlapping sections extend onto opposite sidewalls of the first electrode and are affixed thereto.

7. The apparatus of claim 1, further comprising a control lead coupled to the trigger conductor and accessible from outside of the arc containment chamber.

\* \* \* \* \*